Aug. 20, 1968  T. H. FOGT ET AL  3,397,461
CLOTHES DRYER WITH PLURAL FUNCTION CONTROLLER
OPERATED BY SINGLE CONTROL DIAL
Filed Oct. 5, 1966  2 Sheets-Sheet 2
TIMER SEQUENCE CHART
| CONTACTS | AUTODRY | | | | DAMP DRY | | | | NO HEAT | | |
|---|---|---|---|---|---|---|---|---|---|---|---|
| | REGULAR | OFF | SPECIAL | OFF | REGULAR | WASH & WEAR | DELICATE | OFF | 40  30  20  10 | | OFF |
| 123 | ■ | | ■ | | ■ | | | | ■ | | |
| 129 | ■ | ■ | ■ | ■ | ■ | ■ | ■ | ■ | ■ | | ■ |
| 77 | ■ | | ■ | | ■ | ■ | ■ | | | | |
| 121 | ■ | | ■ | | | | | | | | ■ |
| 108 | | | ■ | | | | | | | | |
| 107 | ■ | | ■ | | ■ | ■ | ■ | | | | |
| 142 | | | | | | ■ | ■ | | | | |
■ CONTACT CLOSED
☐ CONTACT OPEN
*Fig. 4*
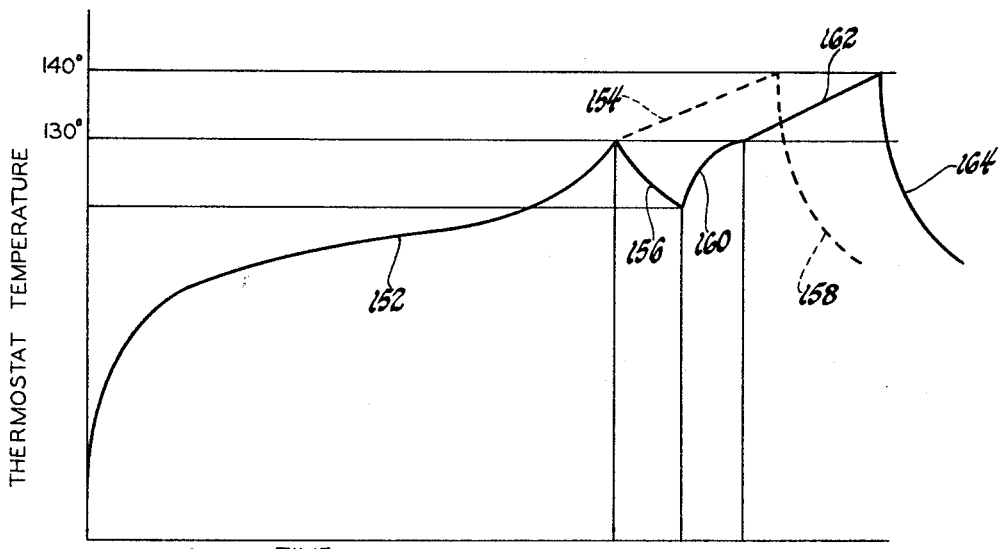
*Fig. 5*
*Fig. 6*
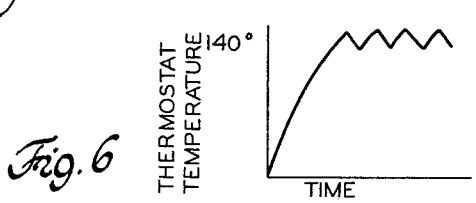
INVENTORS
Thomas H. Fogt, &
BY Mark M. Scherzinger
J.C. Evans
ATTORNEY

United States Patent Office 3,397,461
Patented Aug. 20, 1968

3,397,461
CLOTHES DRYER WITH PLURAL FUNCTION CONTROLLER OPERATED BY SINGLE CONTROL DIAL
Thomas H. Fogt, West Carrollton, and Mark N. Scherzinger, Dayton, Ohio, assignors to General Motors Corporation, Detroit, Mich., a corporation of Delaware
Filed Oct. 5, 1966, Ser. No. 584,405
11 Claims. (Cl. 34—45)

ABSTRACT OF THE DISCLOSURE

In preferred form, a clothes dryer including a motor driven rotatable drum having a heated air stream directed therethrough with an exhaust stream temperature sensed by plural thermostats. One of the thermostats cycling heating means and timer means on and off. Another of the thermostats and a timer switch turning off the heating means at a predetermined sensed exhaust temperature. A single control knob programs timer switches and a heating level switch to obtain separate and distinct automatic, damp dry and no heat cycles of dryer operation.

---

This invention is directed to automatically controlled drying apparatus and more particularly to an improved plural function controller for operating a domestic drying apparatus including a single dial positionable to effect a plurality of automatic drying phases of operation without overdrying articles in the drying apparatus and wherein the single dial establishes a damp dry cycle of controller operation wherein pre-selected residual amounts of moisture remain in the articles following a drying cycle of operation.

In automatically controlled domestic drying apparatus, it is desirable to operate the dryer in a manner to prevent over-drying of articles being processed by the dryer and furthermore to include a capability for retaining controlled amounts of moisture in the articles if desired in order to prevent undesirable wrinkling of the articles and/or to maintain the articles in a condition suitable for ironing or the like.

Basic control systems for automatic dryers have included timer control means pre-settable to operate the dryer for a selected duration of time. In such systems, it is obvious that dryer operation will often extend through a period that might cause an energy input to articles being processed by the drying apparatus whereby articles therein are over-dried. On the other hand, often the time duration is insufficient for removing moisture from certain types of loads and as a result, the drying operation can be terminated prematurely.

An object of the present invention is to improve drying apparatus of the type including automatic control circuit means having timer control means by the provision of a single user control dial positionable to condition the timer means for plural phases of dryer operation and wherein the heating means for the dryer includes plural energy output operations established in part by pre-settable switch means operated by the single control dial to establish desired ranges of energy output from the heating means during the various heating operations and wherein in addition to the timer means and the switch means for conditioning the heating means for variable energy output, the control means further includes a thermostatic control means operatively associated with the timer means and the energy output determining switch means whereby the control system will automatically terminate dryer operation without over-drying articles and retaining a capability for carrying-out a damp dry cycle of dryer operation.

Still another object of the present invention is to improve automatic drying apparatus of the type including a control circuit having timer means therein and thermostatic control means responsive to the exhaust temperature of the dryer for controlling the energy input to the dryer by the provision of plural energy output heating means pre-settable to different energy outputs by switch means operated by a single control dial that is also operative to control the timer means in the control circuit and wherein the timer means and energy input control switch means are operatively associated to control the energy input of the heating means at different levels during first and second drying cycles of operation and wherein the thermostatic means during one of the cycles of operation includes means for cycling the heating means between a high energy output and a low energy output and wherein the same thermostatic means is operative during another drying cycle of operation to cyclically control the heater when it is conditioned for high energy output therefrom.

Still another object of the present invention is to improve a control arrangement of the type set forth in the preceding object wherein the thermostatic means is associated with biasing means for conditioning said thermostatic means during still another drying cycle wherein the single control knob operates the heater conditioning switch means to condition the heater for high energy output to cycle the high energy output from the heater in response to reduced exhaust temperatures and wherein the timer means establishes the duration of the still another drying cycle of operation.

Still another object of the present invention is to improve drying apparatus by the provision of a plural function control system including a single user control dial operatively associated with timer control means and plural energy output heater including pre-settable switch means for conditioning said heater for variable thermal output therefrom and wherein thermostatic control means are associated with the heater energization circuit for modulating the energy output of the heater at each of its conditioned states and wherein the timer control means and heater conditioning switch means are selectively positioned depending upon the operative position of the single control dial to produce a first automatic drying cycle of operation wherein the heater is conditioned for energization between a high energy output and a low energy output and operated between these energy outputs by the thermostatic means; a second automatic drying cycle of operation wherein the heating means is conditioned for a low energy output that is cyclically controlled by the thermostatic means and whereby during both of the automatic cycles of operation the timer control is operatively connected with the thermostatic control means to establish the duration of the drying cycle of operation to prevent under drying of articles being processed; and wherein the single control knob is further positionable to condition said timer control means and heater conditioning switch means to produce a high energy output from said heating means that is cyclically controlled by said thermostatic means in response to lower exhaust stream temperatures during which operation said timer control means establishes a drying period and wherein the drying period is pre-settable by the single control dial to produce a predetermined degree of retained moisture in the articles being processed.

Further objects and advantages of the present invention will be apparent from the following description, reference being had to the accompanying drawings wherein a preferred embodiment of the present invention is clearly shown.

In the drawings:

FIGURE 4 is a control switch sequence chart showing the operative positions of various switching components in the circuit of FIGURE 2 during drying cycles of operation that are pre-settable by the single control dial of FIGURE 3.

FIGURE 5 is a time temperature curve showing an automatic cycle of operation in the dryer of the present invention; and FIGURE 6 is a view of a time temperature chart showing the operation of the dryer during a special automatic drying cycle of operation.

Figure 1:
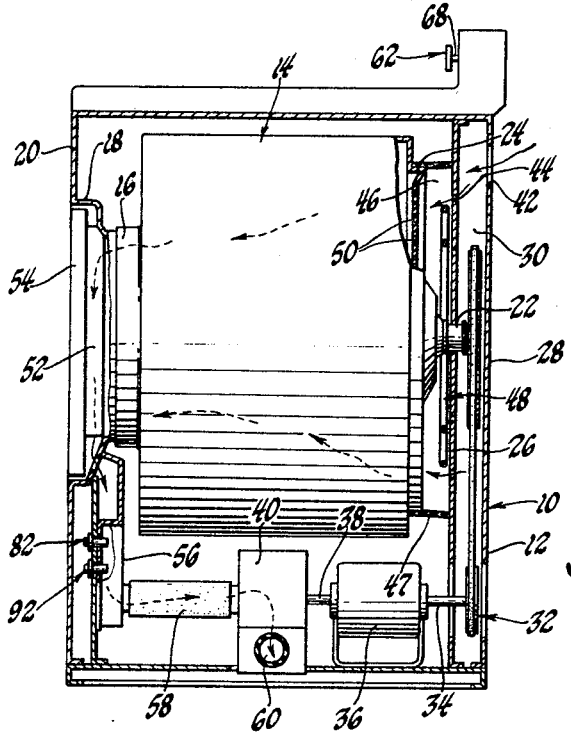
FIGURE 1 is a view in vertical section of a dryer including the improved control system of the present invention.

Referring now to the drawings in FIGURE 1, an automatic clothes drying apparatus 10 is illustrated including an outer casing 12 that encloses a rotatable tumbling drum 14. In the illustrated arrangement, the tumbling drum 14 has an annular front loading port 16 thereon that is rotatably supported on an inwardly directed access port member 18 in the front wall 20 of the outer casing 12. The opposite end of the tumbling drum 14 is rotatably supported by a shaft 22 secured to a rear drum wall 24 and directed rearwardly therefrom through an internal bulkhead 26 in the machine 10 that supports the shaft 22 for rotation thereon.

Between the bulkhead 26 and a rear wall 28, of the dryer 10 is formed a space 30 in which is located a belt pulley assembly 32 that is drivingly connected to the shaft 22 and to an output shaft 34 of an electric drive motor 36 having a second output shaft 38 therefrom connected to a blower assembly 40. The assembly 40 draws air from an inlet port 42 in the rear wall 28 thence through the space 30 and through an opening 44 in the bulkhead 26 into an air heating space 46 between the rear wall 24 of the tumbling drum 14 and the bulkhead 26 that is confined peripherally by an annular sealing member 47 fixedly secured to the bulkhead 26 at one edge thereof and having the free edge thereof in sliding sealing engagement with the rear wall 24. Within the air heating space 46 is located means for heating the air stream including an electrically energizable resistance heating element 48. Air from the heating chamber 46 is drawn through a plurality of small diameter openings 50 in the rear wall 24 thence through the interior of the tumbling drum 14 and through an exhaust duct 52 in a front door closure 54 into an interiorly located return duct 56 thence through an inlet conduit 58 to the blower assembly 40. The heated exhaust air is discharged through an exhaust duct 60 to a point exteriorly of the dryer.

The above described drying apparatus 10 is merely representative of one typical arrangement of a rotatable tumbling drum, drive motor means and air circulation system for practicing the present invention.

Figure 3:
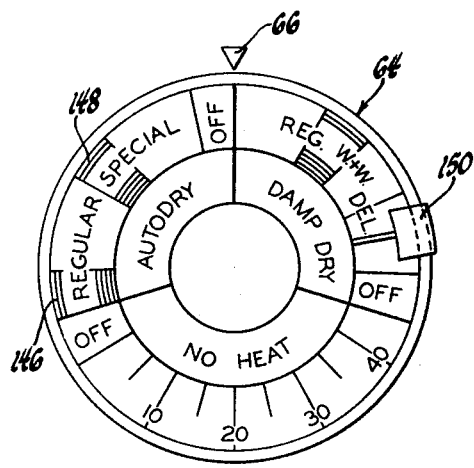
FIGURE 3 is a view in front elevation of a single control dial component of the present invention.

In accordance with certain principles of the present invention, the motor 36 and heating element 48 are selectively energized by a plural function controller 62 that includes a single user control dial 64 that is rotatably supported on a rearwardly located control panel of the outer casing 12 and movable with respect to an indicator 66 to establish a plurality of separate drying cycles of operation in the machine 10. More particularly, as seen in FIGURE 3, these cycles are an auto dry cycle wherein the controller 62 is automatically operative to control the operation of the dryer 10 to terminate the operation thereof when articles within the tumbling drum are completely dried. The auto drive control, as will be discussed, is characterized by terminating the operation of the dryer 10 prior to a point where articles therein might be overdried. Additionally, the single user control dial 64 includes a damp dry cycle wherein the machine 10 is conditioned for a timed cycle of operation and operative to retain a predetermined percentage of moisture in articles at the end of the drying cycle of operation. Still further, the control dial 64 includes a timed no-heat cycle of operation wherein the dryer 10 is operated with the heater 48 thereof de-energized.

Figure 2:
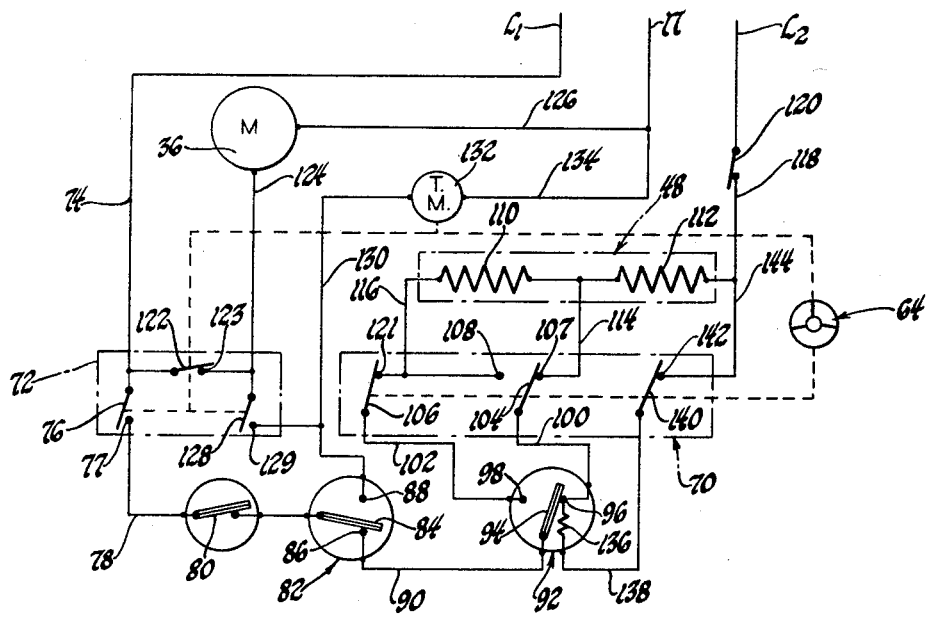
FIGURE 2 is a diagrammatic view of a control circuit including the present invention.

The dial 64 more particularly includes an operating shaft 68 that upon rotation of the dial 64 to one of its operative ranges, positions cam means or the like (not shown) that operate a pre-settable heater conditioning switch 70 and a timer controlled switch 72. The switches 70, 72 are shown in the circuit of FIGURE 2 which further includes a heater energization circuit that is completed from wire $L_1$ through a conductor 74 a timer controlled heater switch 76 including contact 77 thence through a conductor 78 that is connected to a safety thermostat 80 that de-energizes the heater 48 when a predetermined excessive temperature level occurs in the air heating space 46. From the safety limit thermostat 80, the heater energization circuit passes through a first high temperature thermostat 82 in the exhaust duct 56 including a thermally responsive bi-metallic element 84 movable between a contact 86 and a contact 88. When the bi-metallic conducting element 84 engages the contact 86, the heater energization circuit thence passes through a conductor 90 to a second bi-metal disc type thermostat 92 in the exhaust duct 56 having a movable, electrically conductive bi-metallic element 94 selectively positionable in electrical engagement with a contact 96 or a contact 98 respectively connected by conductors 100, 102 to switch blades 104, 106 of the pre-settable heater conditioning switch 70. The switch blade 104 is pre-settable into electrical engagement with first and second contacts 107, 108 to establish a predetermined energy output from the heater 48. More particularly, to accomplish this purpose, the heater 48 includes a pair of split heating element segments 110, 112 which are center tapped by a conductor 114 connected to the contact 107 and end terminals that are respectively connected by a conductor 116 to the contact 108 and a conductor 118 that is electrically connected through a switch 120 centrifugally responsive to operation of the motor 36 to connect wire $L_1$ to wire $L_2$ of a 240 volt alternating current power source.

When the movable switch blade 104 is positioned, as seen in FIGURE 2, and assuming that the thermostat 92 is as shown in FIGURE 2, the heater 48 will have a high energy output established by the resistance of the heating element segment 112. If the movable switch blade 104 is positioned into electrical engagement with contact 108, and assuming that the thermostat 92 is conditioned as seen in FIGURE 2, the heater 48 will have a low energy output therefrom established by the series resistance of the heating element segments 110, 112.

The movable switch blade 106 engages a contact 121 to the heater end terminal connected to heater segment 110. Thus, when the thermostat 92 is conditioned to have the conductive bi-metallic element 94 thereof in electrical engagement with the contact 98, the heater 48 has a low energy output established by the serially connected segments 110, 112.

In addition to the heater energization circuit, the controller includes a motor energization circuit from wire $L_1$ through conductor 74 thence through a timer controlled motor energization switch 122 that is electrically connected by conductor 124 to one side of the motor 36 which has the opposite side thereof connected by conductor 126 to a wire N of the three wire power source. Additionally, the control circuit includes a timer motor energization circuit completed from wire $L_1$ through conductor 74 thence through timer controlled switch 122 with a contact 123 and a timer controlled timer motor energization switch 128 with a contact 129 that is electrically connected by a conductor 130 to one side of a timer motor 132 having the opposite side thereof connected by a conductor 134 to wire N.

Additionally, the circuit of FIGURE 2 includes means for biasing the thermostat 92 including an electrically energizable resistance element 136 that is electrically connected to the heater energization circuit at the contact 96 thence through a conductor 138 and a movable switch blade 140 of the heater conditioning switch 70 that is movable with respect to a contact 142 that is electrically connected by a conductor 144 to conductor 118 thence through switch 120 to wire $L_2$. The movable switch blade 140 is positioned by the single control dial 64 in accordance with the control switch sequence chart of FIGURE 4 during a damp dry cycle of dryer operation to energize the heating element 136 for reasons to be discussed.

By virtue of the control circuit described in FIGURE 2, the single dial 64 is pre-settable to condition the controller 62 to produce three distinct drying cycles of operation including an automatically controlled cycle having a regular phase and a special phase wherein articles are processed to a room dry weight without under or over drying; damp dry cycle wherein various loads of different types of materials are dried to a point where there is a predetermined residual moisture therein so that the articles or clothes are ready for ironing or the like when removed from the dryer; and a no-heat cycle wherein articles are air fluffed or dried without energizing the heater 48.

More particularly, automatic drying cycle is obtained when a clothes load is placed in the dryer and the dial 64 is rotated to a first angular setting zone 146 on the dial 64 or an angular setting zone 148 thereon. It will be noted that the setting zones 146, 148 enable the dial to be positioned to initiate either a regular or a special auto dry phase without requiring setting to a particular radial line. Thus, the dial 64 can be easily positioned without great care and the controller 62 will have its contacts positioned as shown in the sequence chart of FIGURE 4 at the start of both the regular and special phases of operation when the indicator 66 is located at any point in either of the setting zones 146, 148. The regular automatic drying cycle has been found suitable for automatically drying a wide variety of clothes loads including regular cotton family type loads from 2 to 11 pounds and wash and wear and delicate type fabric loads. The regular cycle is also capable of processing hard to dry material such as towels and the like. The special automatic cycle is operative to dry small loads of heavy material such as shag rugs, heavy towels and the like.

The damp dry cycle of operation is designed to establish a residual moisture content in a dryer load. It will be noted that the damp dry segment of the control dial 64 includes three basic damp dry settings correlated to the ability of different types of materials to retain various amounts of water when processed in an automatic washer prior to drying. These settings as shown are regular, wash and wear and delicate. Each of the individual settings in the damp dry cycle are timed as will be discussed, to terminate the dryer operation when the clothes load is within a range of 20 to 30% damp dry (the weight of water with respect to the dry load weight). In order to adapt this cycle to individual preference, an indicating tab 150 may be slidably mounted on the outer periphery of the dial 64 and positionable within the damp dry zone for a particular type of load regularly processed by the dryer 10 at which an exact type of retained moisture is present in the load following the damp dry cycle of operation.

The no-heat cycle is a timed cycle and may be operated up to a maximum of 45 minutes. It is intended to be used primarily for drying various types of articles that might be harmed by a heated air stream as for example certain plastic materials and the like.

Now with reference to the circuit diagram of FIGURE 2 and the control sequence chart of FIGURE 4, the operation of the dryer 10 will be set forth. As previously mentioned, the automatic drying cycle of operation of the controller 62 is sub-divided into two phases, regular and special. Through the description of the operation of the regular automatic drying cycle, the necessity for an individual special cycle to manage small hard to dry type loads will become evident.

Assuming that a regular type of load has been inserted in the tumbling drum 14 and that the dryer controller 62 has the dial 64 thereof moved so that the indicator 66 is aligned with the regular setting zone 146; the motor energization circuit will be completed through switch 122 engaging contact 123; the timer motor energization circuit will be completed through switch 122 engaging contact 123 and switch 128 engaging contact 129; and the heater energization circuit will be completed through switch 76 thence through the safety limit thermostat 80, the high temperature thermostat 82 which in one working embodiment is set to move from contact 86 into engagement with contact 88 when the exhaust temperature from the tumbling drum 14 attains atemperature of 140 degres F.; thence the heater energization circuit passes through the low temperature thermostat 92, that in one working embodiment is responsive to a temperature of 130° F. in the exhaust stream to move from contact 96 to contact 98. At the regular automatic setting, the heater conditioning switch 70 has the movable switch blade 104, 106 thereof positioned by the control dial 64 to be in electrical engagement with contacts 107, 121 to the heater 48.

During initial operation of the dryer 10 through the regular automatic dry cycle of operation, the exhaust stream temperature is relatively low since the articles have a substantial amount of moisture therein which is being evaporated by the energy input from the heater 48. Thus, the bi-metallic switch blade 94 of the thermostat 92 is in electrical engagement with the contact 96 and thereby only the heating element segment 112 of the heater 48 is energized to produce a high energy output from the heater 48 which in one working embodiment, as indicated above, is 5,400 watts. The high energy output from the heater 48 is effectively utilized to evaporate free moisture in the articles being tumbled in the drum 14 and will continue to be applied until a fairly substantial percentage of the free water in the load is removed therefrom during the drying process.

As the load dries, and as seen in FIGURE 5, the exhaust stream temperature rises along the line 152. Eventually, a point is reached where the articles are substantially dry and the high energy input rather than evaporating the free water rapidly increases the temperature of the air stream passing through the tumbling drum whereby the exhaust temperature will rise at a more rapid rate. This change in the rate of temperature increase of the exhaust temperature is produced since there is no longer a sufficient amount of water to change the incoming sensible heat into latent heat of evaporation. It is obvious that the point at which the rate of temperature rise increases in the exhaust stream will vary depending upon the type of load being processed. Thus, the low temperature thermostat 92 is included in the heater energization circuit and is operative in response to a predetermined temperature increase in the exhaust stream that will occur prior to the point that typical loads are dried. This is seen in FIGURE 5 at time $t_1$ where the thermostat 92 in response to an exhaust stream temperature of 130° has the bi-metallic switching element 94 thereof moved from contact 96 into electrical engagement with contact 98 whereby the resistance element segments 110, 112 of the heater 48 are connected in a series so as to reduce the energy output therefrom to a reduced level which in one working embodiment is 3,700 watts. Following this switching action of the thermostat 92 and depending upon the amount of residual moisture left in the clothes load, the exhaust stream temperature either continues to rise along a path 154 or declines along a path 156. If the temperature continues to rise, it indicates that the load is at a near dry condition and the last trace of water will be moved therefrom as the temperature increases up to a final termination temperature of 140° F. wherein the high temperature thermostat 82 opens to de-energize the heater 48.

It is important to note that initially during the regular automatic cycle of operation, the timer 132 is energized since the contact 129 of the energization circuit thereof is closed. However, following a predetermined number of timer advances, the contact 129 is opened thereby to terminate timer control of the operative components of the dryer 10. The timer motor 132 remains de-energized until the high temperature thermostat 82 senses a predetermined temperature such as 140° F. in the exhaust stream at which point the high temperature terminating thermostat 82 has the movable bi-metallic element 84 thereof moved into electrical engagement with the contact 88 to complete a secondary energization circuit for the timer motor 132 whereby it will advance to re-close the contact 129 and thereafter continue to advance through a predetermined cool-down period wherein the motor energization circuit is maintained following which time suitable cam means are operative to move the switch blade 122 to open the contact 123 and thereby de-energize the motor 36 and the timer 132 and thus finally terminate the regular cycle of operation.

If on the other hand, following the point where the low temperature thermostat 92 senses a predetermined exhaust temperature of 130° F., the exhaust air stream temperature rather than continuing along the path 154 decreases along the path 156 thus indicating there is a substantial amount of residual free moisture remaining in the tumbling load, the low temperature thermostat 92 will be reset to condition the heater 48 for its high energy output. The cycling of the energy output from the heater 48 will continue under the control of the thermostat 92 until a negligible amount of water remains in the load at which point the exhaust stream temperature will increase to 140° F. to condition the secondary timer motor energization circuit to cause the dryer operation to be continued to a predetermined time cool-off period following which the drum and blower drive motor 36 and timer motor 132 are de-energized.

In the chart of FIGURE 5, a particular clothes load is shown wherein the exhaust stream temperature fell along the path 156 and thereafter at time $t_2$ increased in temperature along a line 160 to the 130° switching temperature and the exhaust stream temperature continued to increase along a path 162 at time $t_3$ and the high temperature thermostat 82 was operative to terminate energy input to the dryer and re-establish the timer control thereof to produce a cool-off of the drum along a path 164 during the cool-off period.

Since the above described automatic control responds to the exhaust air stream temperature rather than the exact water content of the load, certain small loads of hard to dry material may cause a premature termination due to an increase of by-passed hot air through the dryer drum that is not affected by the water content in the small load. Accordingly, the controller 62 includes a special phase of automatic drying operation wherein the dial 64 is positioned so that the indicator 66 is within the setting zone 148. Under this operative condition as seen in the sequence control chart of FIGURE 4, initially the motor energization circuit is completed along with the timer motor energization circuit and the heater energization circuit through closed contacts 77, 123 and 129 in switches 76, 122 and 128 respectively. Also, the heater conditioning contacts 108, 121 are closed to condition the heater 48 for low energy output therefrom. By virtue of this arrangement, during the initial part of the special automatic drying operation the temperature of the exhaust stream will increase as shown in FIGURE 6 through 130° wherein the low temperature thermostat 92 will switch without affecting the energy input and continue to rise to 140° F. where the high temperature thermostat 82 will cyclically control the low energy output from the heater 48 as illustrated in FIGURE 6. As will be noted, the timer contact 129 is opened following a predetermined number of timer advances and will remain open for a predetermined time period during which, when the exhaust temperature attains a 140° F. level the high temperature thermostat 82 will complete the auxiliary or secondary timer motor energization circuit which is operative to advance the timer in accordance with cyclic control action of the thermostat 82 so that following a predetermined accumulated heater off time, cam means operating the timer controlled switch 128 will position it in electrical engagement with the contact 129 thereby to initiate timer advance independently of the thermostat 82 which as illustrated in FIGURE 4, will open the timer controlled switch 76 to de-energize the heater. Following this the machine is operated through a predetermined cool-off period wherein the motor 36 is energized to circulate air through the tumbling drum for cooling articles therein. It has been found that a special automatic control operation of the aforedescribed type will adequately dry small, hard to dry loads of the type mentioned above to a room dry condition without over-drying.

When the control dial 64 is positioned to locate the indicator 66 within the damp dry region thereon the heater conditioning switch 70 has the contacts 108, 121 thereof opened and the contact 107 thereof closed to thereby condition the split heater 48 to have a high energy output therefrom. Additionally, during this phase of operation, the switch 140 is moved into electrical engagement with the contact 142 whereby an energization circuit for the bias heater 136 is completed so that the low temperature thermostat 92 is responsive to an exhaust stream temperature reduced from that at which it controls the heater 48 during the regular automatic drying cycle of operation. More particularly, in one working embodiment, the low temperature thermostat 92 when biased is responsive to an exhaust stream temperature of 100° F. wherein the movable bi-metallic element 94 thereof moves out of electrical engagement with contact 96. By virtue of the fact that contact 121 is opened, such movement of the bi-metallic element 94 will terminate energy output from the heater 48. Thus, the thermostat 92 during damp dry operation will cyclically control the heater 48 at its high energy output state. During the damp dry cycle of operation, the period of control is established by the timer motor 132 so that following a predetermined period of time depending upon the position in the damp dry region selected for a particular type of article, the timer mechanism will advance to a point wherein independently of the thermostats the heater output is terminated by opening of the timer controlled switch 76. The combined thermostatic and timed control of the heater output to effect a predetermined damp dry condition for different types of articles will depend upon the position of the control dial at the start of the damp dry cycle of operation. Load variations, however, are compensated in that with larger loads the heater on time is increased during the timed cycle as compared to the period of heater on time for smaller loads since larger loads have a greater moisture content that will reduce the rate of exhaust temperature increase whereby the high temperature thermostat 82 will cycle at a reduced rate during a particular timed period established by the timer motor and associated means of the controller 62.

During the third or no-heat cycle of drying operation, the controller contacts are positioned as shown in FIGURE 4 whereby the dryer 10 is operated with the heater energization circuit opened and the motor energization circuit closed under the control of the timer motor 132 for a time period as pre-selected by positioning the control dial 64 to a predetermined point in the no-heat region thereon.

While the embodiments of the present invention as herein disclosed constitute preferred forms, it is to be understood that other forms might be adopted.

What is claimed is as follows:

1. In clothes drying apparatus, the combination of a tumbling drum, means including a drive motor for rotating said drum, means including heating means for directing a stream of hot air through said drum and for exhausting said heated air from said drum, circuit means for energizing said heating means and said drive motor including timer means having plural switch means, means for energizing said timer means including at least one of said plural switch means thereof, said heater energization circuit means including plural thermostatic control means, one of said plural thermostatic control means being responsive to a first predetermined exhaust temperature to cyclically energize said heater means, said timer means being operative during the cyclical control of said one thermostatic means to open said one of said timer control switch means to de-energize said timer means, said thermostat means following a predetermined drying cycle of operation being responsive to a temperature increase in the exhaust from said drum greater than said first predetermined temperature and operative to de-energize said heating means and to re-energize said timer means, said re-energized timer means being operative to position said plural timer switch means to de-energize said heating means and said motor independently of said thermostatic means whereby a timer control cool-off period is effected following control of said heating means by said thermostatic means.

2. In clothes drying apparatus, the combination of a tumbling drum, means including a drive motor for rotating said drum, means including plural energy level heating means for directing a stream of hot air through said drum and for exhausting said heated air from said drum, circuit means for energizing said heating means and said drive motor including timer means having plural switch means, means for energizing said timer means including at least one of said plural switch means thereof, said heater energization circuit means including first and second thermostatic control means, one of said thermostatic means being responsive to a first predetermined exhaust temperature to cyclically energize said heater means between a high and a low thermal output state, said timer means being operative during the cyclical control of said first thermostatic means to open said one of said timer control switch means to de-energize said timer means, said other of said thermostat means following a predetermined drying cycle of operation being responsive to a temperature increase in the exhaust from said drum greater than said first predetermined temperature and operative to de-energize said heating means and to de-energize said timer means, said re-energized timer means being operative to position said plural timer control switches to de-energize said heating means and said motor independently of said thermostatic means whereby a timer control cool-off period is effected following control of said heating means by said thermostatic means.

3. In drying apparatus the combination of a tumbling drum, means including an electric motor for rotating said drum, means including heating means for directing a heated fluid stream through said dryer and to exhaust the heated fluid therefrom, circuit means for controlling the energization of said heating means and said electric motor, said circuit means including a first plurality of pre-settable switch means for conditioning said heating means for plural thermal outputs, timer control means including a plurality of timer controlled switches selectively operable to control the energization of said electric motor, said heating means and said timer means, pre-settable user control means for operating said timer means and said heater conditioning switch means, said circuit means including thermostatic means responsive to predetermined fluid stream temperatures to control the energization of said heating means, said pre-settable user control means being positionable to a first control position to set said heater conditioning switch means whereby said thermostatic control means during a drying cycle of operation will automatically cycle the thermal output from said heating means between a high and a low energy output state, said timer controlled switch means being operative at said first control position to de-energize said timer means during the thermostatic control of said heating means, said thermostatic control means upon sensing a predetermined fluid stream temperature re-energizing said timer means whereby said timer means independently of said thermostatic control means de-energizes said heater means and establishes a predetermined cool-off period wherein said electric motor is maintained energized for a predetermined period of time following which said electric motor is de-energized, said user control means being positionable in a second automatic control position wherein said heater conditioning switch means will condition said heating means for a low energy output, said thermostatic control means being operative to cyclically control the energization of said heater means at said low energy output state, said timer means being operative at said second control position to condition one of said timer switch means to de-energize said timer means, said thermostatic control means upon sensing a predetermined maximum temperature in said fluid stream re-energizing said timer means whereby said timer means will produce a second timer controlled cool-off period, said pre-settable user control means including a third operative position wherein said pre-settable heater conditioning switch means are positioned to condition said heating means for a high thermal output therefrom, means for biasing said thermostatic means operative at said third control position to energize said thermostatic biasing means whereby said thermostatic means is operative in response to an exhaust stream temperature reduced from that of said first predetermined temperature to cyclically energize said heating means, said timer control means being continuously energized during cyclical energization of said heating means by said biased thermostatic means and operative following a predetermined period of time to terminate cyclical energization of said heater means by conditioning one of said timer controlled switch means to de-energize said heating means independently of said thermostatic means.

4. In the combination of claim 3, said pre-settable user control means having a fourth operative position wherein said timer control means are operated to condition another of said timer controlled switches to maintain said heating means continually de-energized while producing motor energization causing said tumbling drum to rotate and fluid to be circulated therethrough without directing energy from said heating means to articles tumbled within said drum.

5. In the combination of claim 3, said pre-settable user control means for conditioning said heating means including bias heater switch means for completing an energization circuit for said biasing means for said thermostatic means during a damp dry cycle of operation, said biasing means being located in heat transfer relationship with exhaust from said tumbling drum whereby said biasing means is cooled in accordance with the size of the load being tumbled by said drum.

6. In the combination of claim 3, said pre-settable user control means including a single control knob having a predetermined extent thereon to which said knob can be positioned without effecting the operation of the automatic drying cycle by said timer controlled switch means and said presettable switch means for conditioning said heating means.

7. In the combination of claim 3, said pre-settable user control means including a control dial having a movable indicator tab thereon shiftable through a predetermined planar extent of said dial for indicating predetermined operation setting points for the dial during a damp dry operation whereby a user can pre-select a particular control position for modifying the damp dry cycle of operation to produce a damp dry cycle suited to a particular type of load being processed.

8. In the combination of claim 3, said heating means including a split electrically energizable resistance element having a center tap and first and second end terminals, one of said end terminals being connected to a power source the other of said end terminals being adapted to be selectively connected to first and second of said heating means conditioning switch means, said center tap adapted to be electrically connected to said second of said heating means conditioning switch means, said pre-settable user control means during an automatic drying cycle of operation positioning said first and second heater control switch means in electrical contact with said other end terminal and said center tap respectively whereby said thermostatic means upon sensing a predetermined exhaust temperature will operate said split resistance element to produce a high and low thermal output therefrom.

9. In the combination of claim 8, said first and second heater means conditioning switch means being positionable during a special automatic drying phase of operation whereby said first switch is opened and said second switch is electrically connected to said other end of said split resistance element whereby said elements of said heating means are in series relationship with one another to produce a low energy output from said heating means and wherein said thermostatic means is operative to cyclically control the power supply to said serially connected heating elements in accordance with the temperature of the fluid stream.

10. In the combination of claim 8, said pre-settable user control means when positioned for a damp dry cycle of operation operating said first and second heater conditioning switch means to connect said first heater conditioning switch means to said other end of said split resistance element and said second switch to said center tap of said split resistance element, said switching means for conditioning said heating means further including a third switch positioned by said control dial at the damp dry cycle of operation to complete an energization circuit for said biasing means, said split heater thereby being conditioned for a high thermal output and said thermostatic means being operative in response to the exhaust temperature from said tumbling drum to cyclically control said high thermal output from said heating means during the damp dry cycle of operation.

11. In the combination of claim 10, said timer control means being operative following a predetermined timer period to open said timer controlled heater energization switch for terminating heat input to said tumbling drum independently of said thermostat means whereby said timer control means establishes a predetermined residual amount of moisture in said articles following a damp dry cycle of operation.

References Cited
UNITED STATES PATENTS

| | | | |
|---|---|---|---|
| 2,851,789 | 9/1958 | Dunkelman | 34—45 |
| 3,037,296 | 6/1962 | Cooley et al. | 34—45 |
| 3,159,465 | 12/1964 | Morey | 34—45 |
| 3,218,730 | 11/1965 | Menk et al. | 34—45 |

FREDERICK L. MATTESON, JR., *Primary Examiner.*

A. D. HERRMANN, *Assistant Examiner.*